(12) United States Patent
Mussetter (10) Patent No.: US 10,465,876 B2
(45) Date of Patent: Nov. 5, 2019

(54) METHOD AND APPARATUS FOR PROVIDING A SUPPLEMENTAL LIGHT SOURCE TO A MOTOR VEHICLE

(71) Applicant: Xtreme Truck & Trailer Specialties, Inc., Troutman, NC (US)

(72) Inventor: Jason Michael Mussetter, Troutman, NC (US)

(73) Assignee: Xtreme Truck & Trailer Specialties, Inc., Troutman, NC (US)

( * ) Notice: Subject to any disclaimer, the term of this patent is extended or adjusted under 35 U.S.C. 154(b) by 0 days.

(21) Appl. No.: 15/822,166

(22) Filed: Nov. 26, 2017

(65) Prior Publication Data

US 2018/0245766 A1 Aug. 30, 2018

Related U.S. Application Data

(60) Provisional application No. 62/464,488, filed on Feb. 28, 2017.

(51) Int. Cl.
| | | |
|---|---|---|
| *F21V 21/00* | (2006.01) | |
| *F21S 43/19* | (2018.01) | |
| *B60Q 1/48* | (2006.01) | |
| *B60Q 1/34* | (2006.01) | |
| *B60Q 1/00* | (2006.01) | |
| *F21V 23/04* | (2006.01) | |
| *B60Q 9/00* | (2006.01) | |
| *F21S 43/20* | (2018.01) | |
| *F21S 43/14* | (2018.01) | |
| *B60Q 1/26* | (2006.01) | |
| *B60Q 1/46* | (2006.01) | |
| *F21Y 115/10* | (2016.01) | |
| *F21W 103/20* | (2018.01) | |

(Continued)

(52) U.S. Cl.
CPC .......... *F21S 43/195* (2018.01); *B60Q 1/0041* (2013.01); *B60Q 1/0076* (2013.01); *B60Q 1/2607* (2013.01); *B60Q 1/34* (2013.01); *B60Q 1/46* (2013.01); *B60Q 1/48* (2013.01); *B60Q 9/00* (2013.01); *F21S 43/14* (2018.01); *F21S 43/26* (2018.01); *F21V 23/0407* (2013.01); *B60Q 2900/10* (2013.01); *B60Q 2900/30* (2013.01); *F21W 2103/10* (2018.01); *F21W 2103/20* (2018.01); *F21W 2103/30* (2018.01); *F21Y 2115/10* (2016.08)

(58) Field of Classification Search
CPC ........ F21S 43/195; F21S 41/19; F21S 41/192; B60R 1/1207; B60Q 1/2665; B60Q 1/2696; B60Q 1/2607; B60Q 1/44; B60Q 1/0041; B60Q 1/38; B60Q 1/04; F21V 15/01
USPC .......................................... 235/541, 487, 545
See application file for complete search history.

(56) References Cited

U.S. PATENT DOCUMENTS 6,015,219 A * 1/2000 Kelly ..................... B60Q 1/007
362/241

* cited by examiner

*Primary Examiner* — Jamara A Franklin
(74) *Attorney, Agent, or Firm* — Brad Bertoglio; Intelink Law Group PC

(57) ABSTRACT

Methods and apparatuses provide a supplemental light source, such as a strobe light, for a motor vehicle. An adapter may be provided to mount a supplemental light source to an existing primary light source, such as a parking and turn signal light bulb. A wiring assembly may interconnect the supplemental light source with a controller, such as a switch. The combined primary and supplemental light sources may then be inserted into a vehicle light housing through an existing light bulb aperture, without creating additional apertures or otherwise modifying the light housing.

26 Claims, 6 Drawing Sheets

(51) Int. Cl.
*F21W 103/30* (2018.01)
*F21W 103/10* (2018.01)

METHOD AND APPARATUS FOR PROVIDING A SUPPLEMENTAL LIGHT SOURCE TO A MOTOR VEHICLE

FIELD OF THE INVENTION

The present invention relates generally to vehicle custom lighting, and in particular to a lighting mechanism that may be utilized to install a custom light source, such as a strobe light, into an existing light housing, such as a parking and turn signal light housing.

BACKGROUND

While motor vehicle manufacturers offer a wide assortment of motor vehicles, individuals still commonly desire to customize their motor vehicles based on the individual's needs or preferences. One such customization that is frequently desired is the addition of strobe lights to a vehicle. Strobe lights may be used for both functional and aesthetic purposes. For example, emergency vehicles may utilize strobe lights to help notify others of the vehicle's presence, activities and likelihood of engaging in unusual or unexpected maneuvers. In other applications, strobe lights may be useful to attract the attention of other drivers to vehicles that may be parked along a roadside or within a road median, such as landscapers or utility service workers. In yet other applications, strobe lights may be utilized by motor vehicle enthusiasts to express individuality and/or to achieve desired aesthetic results. These and other use cases may call for the installation of strobe lights on a motor vehicle.

While strobe light installation may be important to some applications, many conventional techniques for adding strobe lights to a motor vehicle involve extensive or undesirable vehicle modifications. For example, one option for adding strobe bulbs to a vehicle may involve drilling new holes into existing light housings, such as the left and right tail light housings and/or headlight housings. But such aftermarket drilling procedures may sacrifice the water or weather resistance of the light housing, potentially leading to water collection in the housing or premature failure of the housing and/or bulb. Drilling into an existing housing may also sacrifice the structural integrity of the housing, such as causing cracks requiring replacement of a costly light housing. For these and other reasons, it may be desirable to provide improved mechanisms and procedures for installation of custom lighting into a motor vehicle.

SUMMARY

A lighting apparatus is provided for use with vehicles, such as automobiles. In accordance with one aspect, a supplemental light apparatus, such as a strobe light or differently-colored light, is adapted for mounting within a vehicle light housing. An adapter includes a proximal end engaged with a primary light source, such as a parking and turn signal bulb, headlight bulb, or other type of light. A supplemental light source is mounted to the adapter. In some embodiments, the supplemental light source may be mounted to a distal end of the adapter. In some embodiments, the distal end of the adapter may include a lens, with the supplemental light source mounted beneath the lens and facing outward. Thus, the adapter and secondary light source may be supported within a vehicle light housing by the primary light source.

A wiring assembly may interconnect the supplemental light source with a controller (such as a switch), such that is may be controlled independently of the primary light source. The wiring assembly may be routed, at least in part, through a hollow cavity in the adapter.

The supplemental light apparatus may be provided as a kit, and may be mounted to a pre-existing primary light source, potentially without drilling any new holes into, or otherwise modifying, a vehicle light housing into which the supplemental light source will be installed. In some embodiments, a pre-existing bulb may be modified by removal of an end cap, which end cap may be replaced by the adapter and engaged via, e.g., friction mounting. In other circumstances, the supplemental light source may be mounted to the primary light source during initial manufacture of the light assembly.

In accordance with another aspect of the disclosure, a method is provided for installing a strobe light on an emergency or safety vehicle, preferably without drilling any additional holes in, or otherwise modifying, a vehicle light housing in which the strobe is installed. An adapter is provided for engaging a strobe light assembly to an existing parking and turn light. The strobe light assembly may include one or more strobe lights and a control circuit. The method further includes engaging the adapter to an end of the parking and turn signal light, engaging the strobe light assembly to the adapter, and hardwiring the strobe light circuit board to a strobe light controller on the vehicle, such as a switch.

In accordance with yet another aspect, a light apparatus is provided for mounting within a vehicle light housing. A primary light bulb includes a connector for insertion into a motor vehicle light socket. A supplemental light source, such as a strobe light and which may include one or more LEDs and a circuit board for driving the LEDs, may be mounted on the primary light bulb. A wiring assembly extends from the supplemental light source to a controller, via which the supplemental light source may be controlled independently of the primary bulb. These and other aspects are described further hereinbelow.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION

The present invention may be understood more readily by reference to the following detailed description of exemplary embodiments, taken in combination with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In some embodiments, custom lighting may be installed in a motor vehicle, within a pre-existing light housing, using only pre-existing openings in the housing. In some embodiments, an attachment may be mounted onto a standard or pre-existing light bulb, in order to provide additional light emitting capabilities. Wiring necessary to power and control the additional light emitting element may be routed through the standard or pre-existing light bulb mechanism. In other embodiments, a custom bulb may be developed in accordance with standardized bulb sizing, providing additional light emitting elements and therefore additional functionality. These and other embodiments are described further herein.

Figure 1:
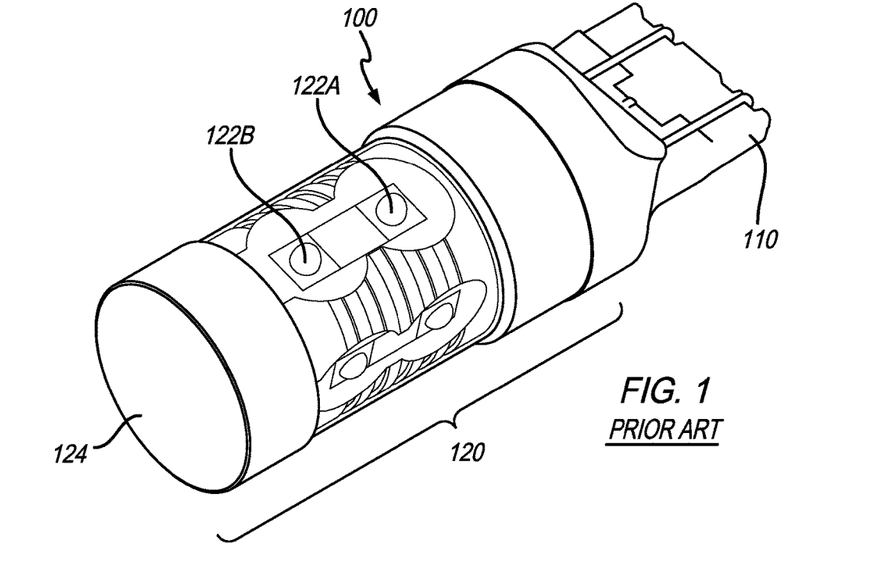
FIG. 1 is a perspective view of a prior art parking and turn signal light.

Referring now specifically to the figures, FIG. 1 illustrates a standard, prior art commercial light bulb with which an embodiment of the invention may be used. Bulb 100 is intended for use in a motor vehicle, such as a headlight bulb or a dual function white/amber bulb such as may be used in a vehicle tail light. Examples of bulbs 100 may include, without limitation, a 3157, 7443, or 1157 bulb manufactured by Putco from Des Moines, Iowa.

Figure 2:
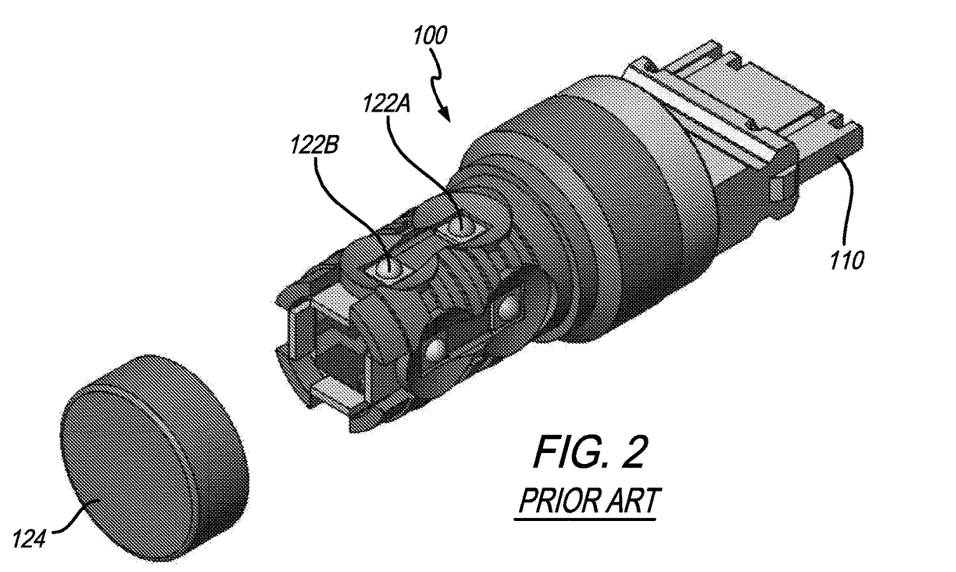
FIG. 2 is an exploded perspective views of a prior art parking and turn signal light.

Bulb 100 includes connector base 110. Connector base 110 is adapted for removable engagement with a tail light socket, in which bulb 100 may be installed. Bulb 100 further includes body 120. Multiple light emitting diodes (LEDs) 122 are positioned around body 120, including orange LEDs 122A and white LEDs 122B. LEDs 122 may be activated by application of appropriate power and control signals to conductors within connector base 110. Bulb 100 further includes end cap 124. In some embodiments, end cap 124 may be readily removable. FIG. 2 is an exploded perspective view of bulb 100, with end cap 124 removed.

A standard vehicle light bulb, such as bulb 100, may be modified to facilitate installation of additional lighting functionality in a motor vehicle, without damaging or permanently modifying the vehicle's light housing or other sensitive components. In some embodiments, a kit may be provided for an installer to modify an existing light bulb. In some embodiments, a previously-manufactured light bulb component may be modified as described herein for additional lighting functionality, and re-sold as a complete part. In yet other embodiments, a light bulb manufacturer may utilize structures and methods described herein to manufacture a component part having capabilities for diverse lighting functionality, such as an added strobe function that may be controlled by an aftermarket lighting controller. These and other embodiments may be implemented using the teachings described herein.

Figure 3:
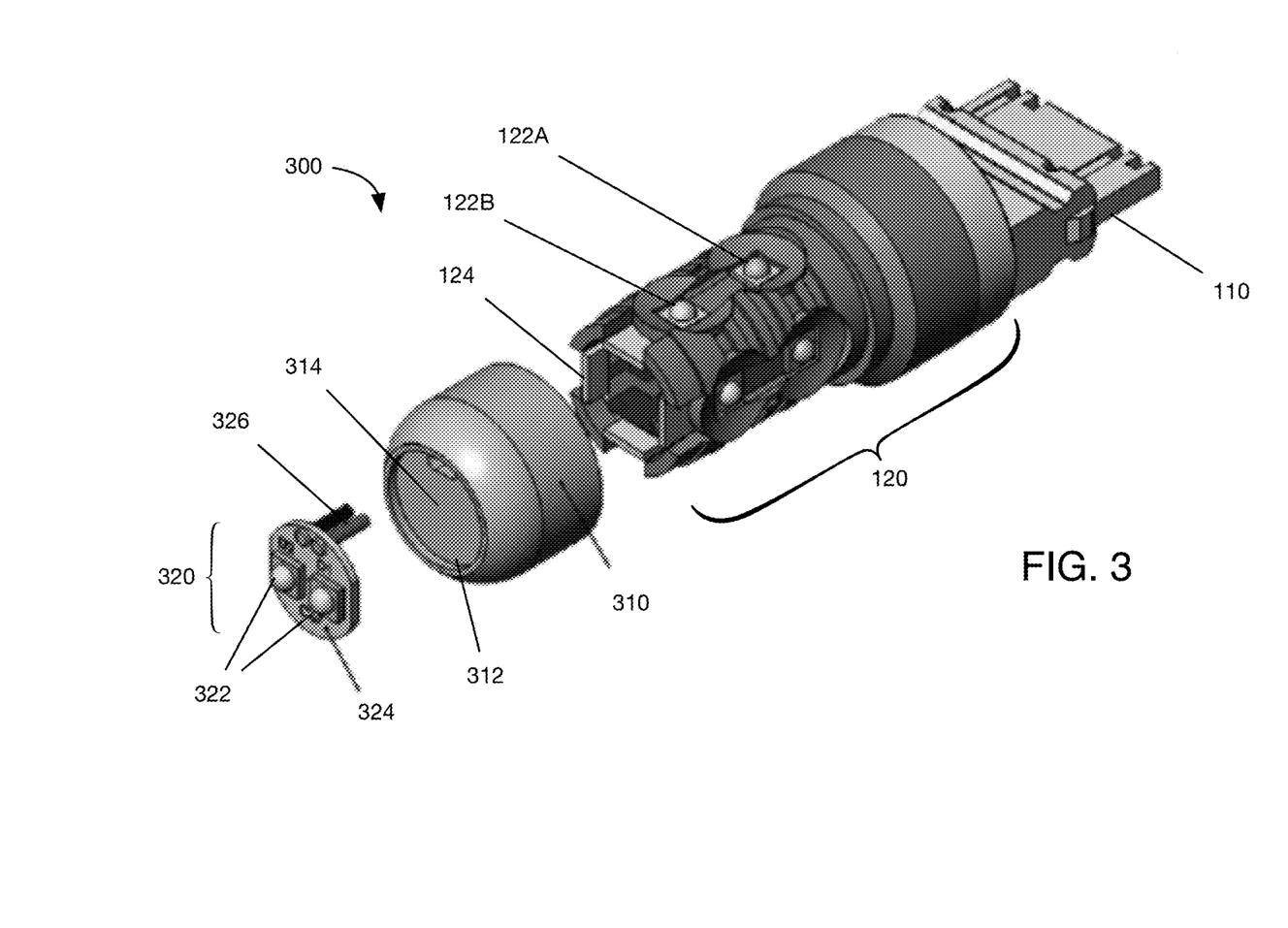
FIG. 3 is an exploded perspective view of a first embodiment.

FIG. 3 illustrates an embodiment in which standard parking and turn light bulb 100 is modified to provide additional strobe functionality, which may be controlled completely independently of the based white/amber illumination provided by bulb 100. FIG. 3 is an exploded perspective view, with wiring omitted for clarity. Specifically, modified bulb 300 includes base 110, body 120, and primary amber LEDs 122A and white LEDs 122B. Cap 130 has been removed and replaced with adapter 310, which acts as an alternative end cap to bulb 300. As described further below, adapter 310 engages with bulb body 120, and further mounts supplemental light attachment 320.

Supplemental light source LEDs 322 are disposed on the face of, and controlled by, supplemental light circuit board 324. In some embodiments, supplemental light source 320 may be a strobe light; in one such embodiment, a HIDE-A-LED Bullet Strobe assembly from Ecco Warning Lights Inc. of Tinley Park, Ill., may be utilized as supplemental light source LEDs 322 and supplemental light circuit board 324. In some embodiments, supplemental light source strobes may be specified to have any of a number of different colors, such as white, red, blue and/or amber. Supplemental light circuit board 324 may connect to a controller (FIG. 7) via wiring assembly 326 (partially omitted from FIG. 3 for clarity, and described further below). Supplemental light attachment 320 mounts directly into an end of the adapter 310, with LEDs 322 facing outwards.

Adapter 310 contains a generally cylindrical housing having an outer surface, an inner surface, a first end, and a second end. Preferably, adapter 310 may be machined from aluminum; in other embodiments, other metals or plastics may be effectively used, to the extent they have.

A distal end of the adapter 310 contains a frustoconical portion. A generally circular opening 312, leading to central cavity 314, is disposed within the distal end of the adapter 310, and engages with a generally-circular supplemental light circuit board 324. A proximal end of adapter 310 may be generally hollow and dimensioned to be disposed over and engaged to an end of a light bulb having independent primary lighting functionality, such as an existing parking and turn light 100 with end cap 130 removed. Preferably, adapter 310 engages with a light bulb body by friction fit. Alternatively, adapter 310 may be engaged to a lighting device by adhesive means or mechanical means, such as glue, screws, clamp, or the like. The primary lighting device may then provide support for supplemental light source 320 when installed within a vehicle light housing.

Figure 4:
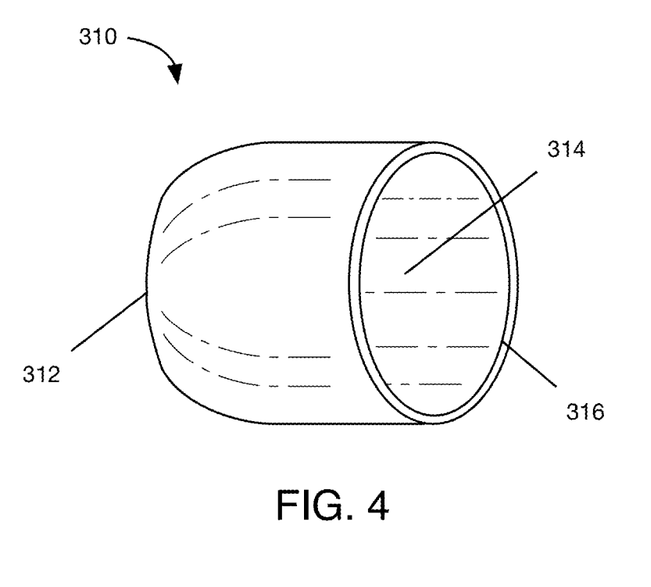
FIG. 4 is a rear perspective view of an adapter.

Adapter 310 is illustrated further in the rear perspective view of FIG. 4. The inner diameter of opening 316 in the proximal end of adapter 310 has a diameter slightly larger than the diameter of the end 124 of the parking and turn light body 120. The proximal end of adapter 310 contains an opening 316 that preferably extends from the proximal end of the adapter and into the hollow portion 314, towards distal end opening 312.

Figure 5:
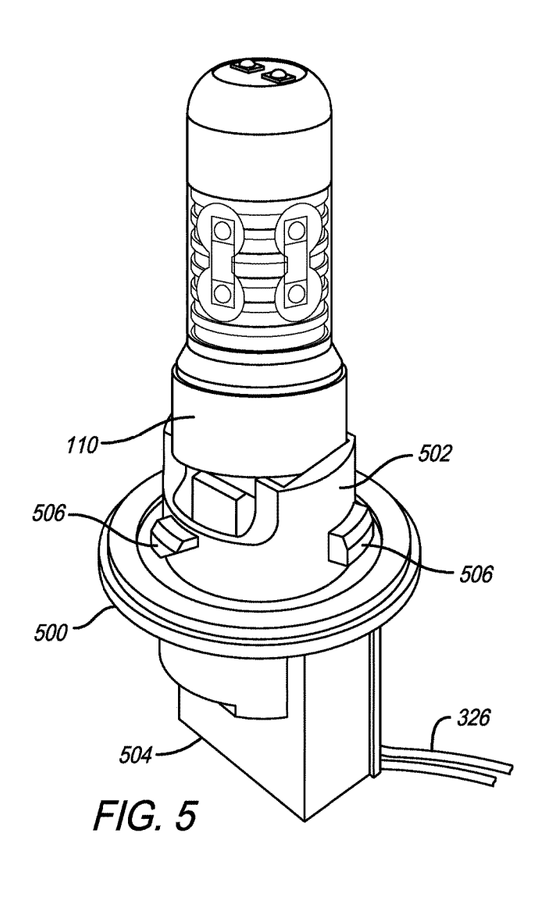
FIG. 5 is a perspective view of a vehicle light with supplemental light source, mounted in a vehicle light socket.

In operation, bulb 300 will be installed in a vehicle lighting receptacle assembly in order to provide physical support for the bulb, as well as power for and control over primary LEDs 122. FIG. 5 is a perspective view of bulb 300, as installed in a typical lighting receptacle assembly 500. Light base 110 is inserted into receiver 502, such as via a friction-based engagement mechanism. Lighting receptacle assembly 500 electrically interconnects bulb 100 with bottom side connector 504, to which a vehicle wiring harness may be connected. Meanwhile, mounting tabs 506 allow for top portion 508 of assembly 500 to be inserted into an opening in a light housing. When twisted, mounting tabs 506 act against the perimeter of the light housing opening in order to form a secure, weather-resistant seal with the light housing.

Figure 6:
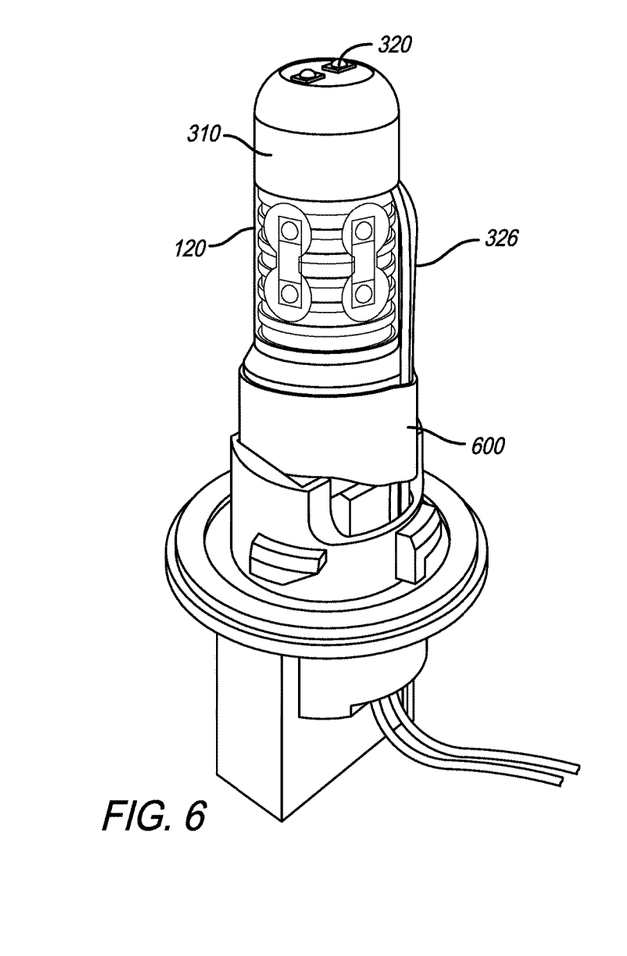
FIG. 6 is a perspective view of a vehicle light with supplemental light source, mounted in a vehicle light socket, with a supplemental light source wiring assembly.

FIG. 6 provides a view of the lighting assembly of FIG. 5, from an opposing side. The view of FIG. 6 illustrates electrical connectivity of the supplemental light attachment. For example, supplemental light source wiring assembly 326 extends from supplemental light source 320, through the interior cavity 314 of adapter 310 and out of proximal opening 316. Wiring assembly 326 passes out alongside bulb body 120, and is preferably secured in position by wire retainer 600. In the embodiment of FIG. 6, wire retainer 600 is formed from an elastic band, to facilitate easy removal and reinstallation. In other embodiments, wire retainer 600 may be formed from, for example and without limitation, electrical tape, silicone adhesive, or other mechanism for maintaining the position of wiring assembly 326. Wiring assembly 326 continues to route through bulb receiver 502 and lighting receptacle assembly 500. In some embodiments, lighting receptacle assembly 500 may include a channel or aperture through which wiring assembly 326 may be routed, to pass outside the housing, for interconnection with an external controller. In other embodiments, lighting receptacle assembly 500 may not provide an aperture through which wiring assembly 326 may be passed; in such circumstances, it may be necessary to drill or otherwise form a small aperture allowing wiring assembly 326 to pass through lighting receptacle assembly 500.

While in the embodiment of FIG. 6, wiring assembly 326 passes outside a housing for primary light source 120, in other embodiments, wiring assembly 326 may be passed internally through the body of primary light source 120 (e.g. through an internal cavity within the primary light bulb, or beneath an exterior glass or polymer protective cover that surrounds primary LEDs 122). In yet other embodiments, wiring assembly 326 may include conductive traces on a PCB, a length of flexible PCB, or other components capable of conductive power and/or control signals to the supplemental light source.

Figure 7:
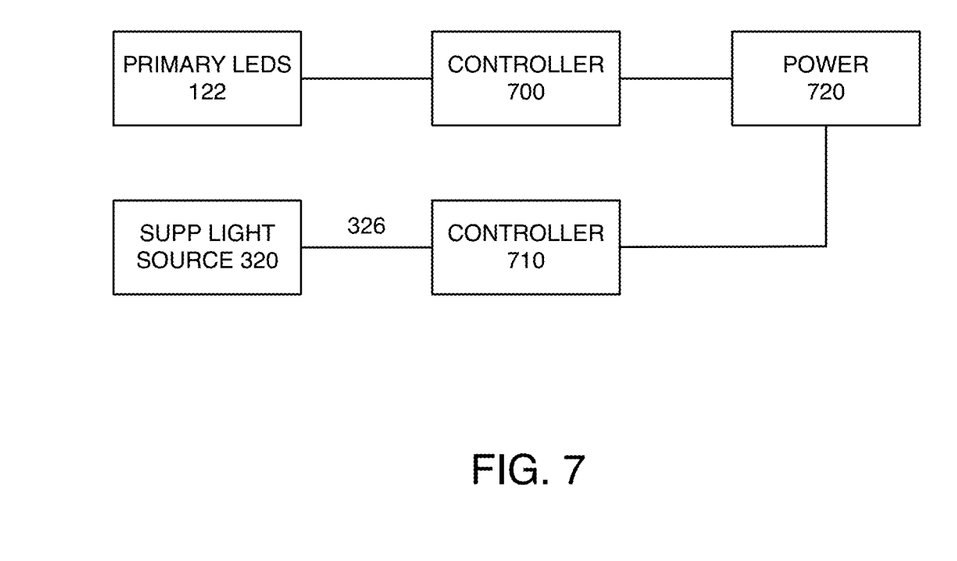
FIG. 7 is a schematic block diagram of a vehicle lighting system.

FIG. 7 is a schematic block diagram of an exemplary control arrangement. The arrangement of FIG. 7 allows for primary light sources 122 to be controlled separately and independently of supplemental light source (e.g. strobe) 320. Vehicle power source 720 powers primary vehicle lighting controller 700, which in turn illuminates one or more of primary LEDs 122, in accordance with normal vehicle operation. Simultaneously, vehicle power source 720 powers supplemental lighting controller 710, which in turn drives wiring assembly 326 to control supplemental light source 320.

In some embodiments, supplemental lighting controller 710 may simply be a single pole single throw switch, and wiring assembly 326 may be a simple two-conductor wiring assembly. In such an embodiment, when the switch is placed into an on position, controller 710 applies vehicle power through wiring assembly 326 to strobe light circuit board 324, initiating a predetermined mode of strobe light operation. In turn, placing the switch into an off position depowers strobe light circuit board 324 and ceases strobe operation. In other embodiments, more complex modes of operation and control may be provided. For example, controller 710 may be an electronic control module, with wiring assembly 326 including both power and control lines, driving a circuit board 324 capable of responding by initiating any of multiple modes of operation.

While the embodiment of FIG. 7 illustrates operation of a single supplemental light source 320, it is contemplated and understood that multiple supplemental lighting assemblies may be installed in a single vehicle. For example, common automotive installations may include strobe assemblies mounted within housing assemblies at each of four vehicle corners, promoting good visibility from all directions. Each such supplemental light source 320 may be controlled by a single controller 710, by separate controllers, or combinations thereof.

In yet other embodiments, wiring assembly 326 may be utilized to supply power to supplemental light source 320, with control signaling being supplied wirelessly. For example, supplemental light source circuit board 324 may include a Bluetooth transceiver. Wireless communications with other devices may be utilized to activate and deactivate supplemental LEDs 322. Such embodiments may provide for, e.g., smartphone control of supplemental lighting.

Figure 8:
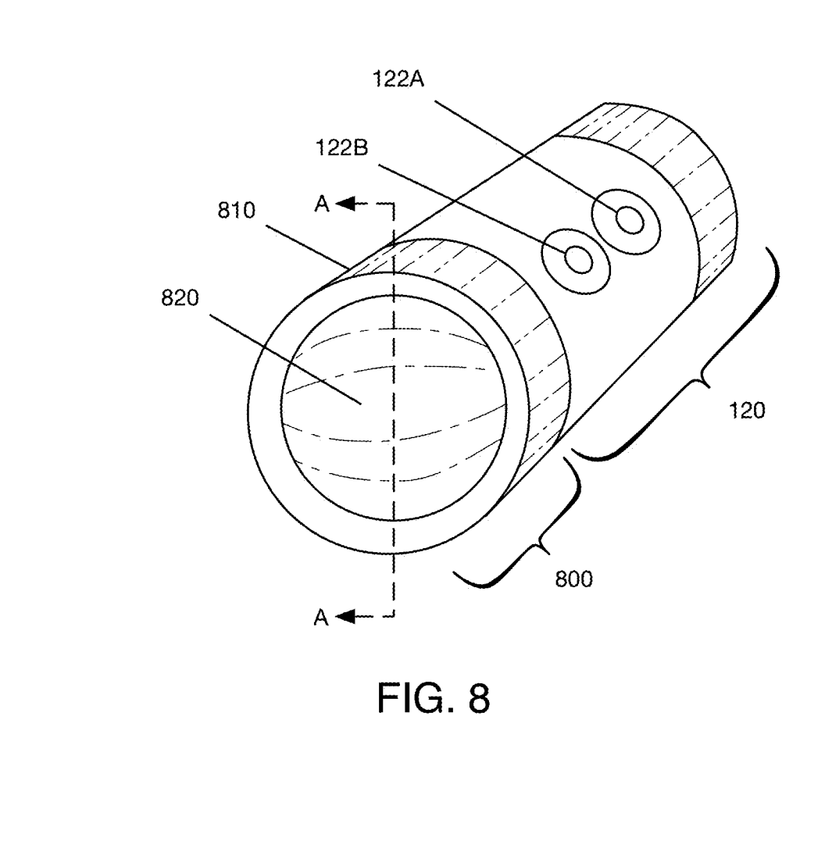
FIG. 8 is a perspective view of a light with supplemental light source mounted thereto, in accordance with a further embodiment.
Figure 9:
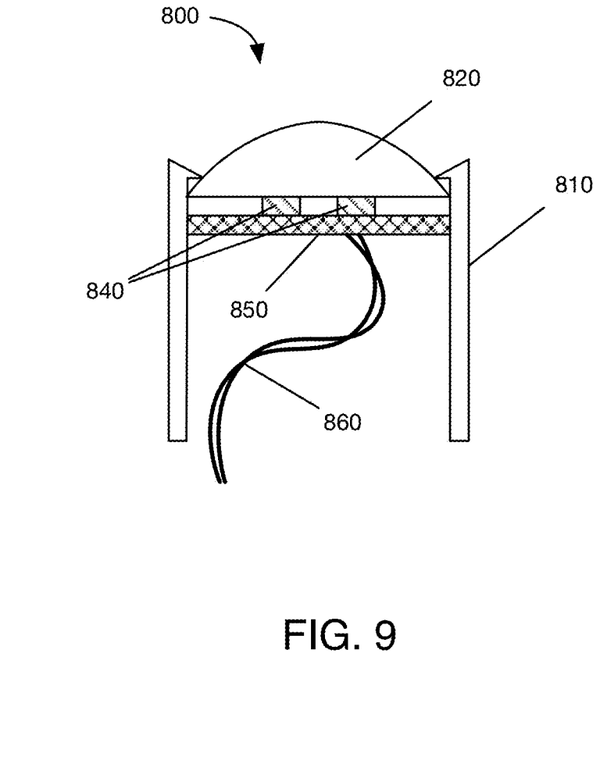
FIG. 9 is a cross section A-A of the embodiment of FIG. 8.

In the embodiment of FIG. 3, supplemental light source 320 is mounted to a distal portion of adapter 320, in an externally-facing and externally-exposed position. However, in other embodiments, different mounting configurations may be employed. For example, FIG. 8 illustrates an alternative embodiment in which a supplemental light source is mounted beneath a domed lens endcap in order to further control the dissemination of light emitted by the supplemental light source. In particular, supplemental light source 800 is mounted on primary light source body 120, similarly to supplemental light source 320 in the embodiment of FIG. 3. However, supplemental light source 800 comprises a peripheral collar 810, and a lens element 820. Peripheral collar 810 serves to secure supplemental light source 800 to the primary bulb, while also retaining lens 820. Peripheral collar 810 may be machined from aluminum, or formed from another material adequate to reliably support lens 820, supplemental LEDs 840, and any associated circuitry or other components. Supplemental LEDs 840 and an associated control circuit 850 may be mounted beneath lens 820, facing outwards, as illustrated in the cross-section A-A view of supplemental light source 800 in FIG. 9. Supplemental light source wiring assembly 860 extends through an interior cavity of collar 810, and out of an aperture in its proximal end, for interconnection with a control circuit such as controller. Lens 820 may be formed from glass, plastic or other transparent or translucent material, thereby allowing light emitted by supplemental LEDs 840 to pass through it in a controlled manner. In some embodiments, lens 820 may be a convex lens to distribute light from LEDs 840 across a broad angle of distribution. In some embodiments, lens 820 may include a filter, in order to modify the spectral content (e.g. color) of light emitted by LEDs 840.

It will be appreciated that the components parts of the illustrated embodiments may be composed of any number of materials and any size necessary to accomplish the intentions set forth herein. For example, the size and shape of an adapter may be suited to allow mounting of the adapter onto any sized bulb, whether retrofitting a previously-manufactured bulb (e.g. via a supplemental lighting kit) or supporting a supplemental light source using a primary light source during the initial manufacture of a unitary multiple-source bulb. The adapter size and shape may also engage with a variety of different shapes, sizes, constructions and mounting positions for the supplemental light source and/or supplemental light circuit board. In some embodiments, an adapter may be machined from aluminum, as aluminum may provide high levels of mechanical strength, heat conductivity and temperature resistance to avoid breakage, deformation and/or failure of supplemental light source 320 in typical conditions experienced by motor vehicle lighting assemblies. In other embodiments, alternative materials may be utilized, as appropriate to carry out the intended functionality described herein in connection with an intended application.

While some embodiments are described herein in connection with LED light bulbs and LED strobes, it is contemplated and understood that other types of primary and supplemental lighting devices may be used as well. For example, rather than white and amber LEDs 122, in other embodiments, the primary lighting device may provide a single color of illumination, different colors of illumination, and/or may be based on alternative light emitting technologies such as incandescent, halogen, HID or laser-excited light sources. In some embodiments, the supplemental light functionality could provide continuous illumination, continuously variable illumination and/or illumination (whether strobe, continuous or continuously-variable) in different and/or multiple colors.

To the extent that embodiments described herein may be described as suitable for use in connection with motor vehicles, it is contemplated and understood that the term motor vehicles may include a wide variety of motive equipment commonly having lights installed therein, including, but not limited to: automobiles, trucks, vehicles having internal combustion engines, vehicles powered by electric motors, motorcycles, scooters, snowmobiles, locomotives, rail vehicles, helicopters and other aircraft, and watercraft.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

What is claimed is:

1. A supplemental light apparatus adapted for mounting within a vehicle light housing, comprising:
    an adapter having a proximal end engaged with a primary light source; and
    a supplemental light source mounted to the adapter;
    wherein the adapter and secondary light source, when in use, are supported within a vehicle light housing by the primary light source.

2. The supplemental light apparatus of claim 1, in which the secondary light source is mounted to a distal end of the adapter.

3. The supplemental light apparatus of claim 1, in which the adapter proximal end is attached to the primary light source by removing a primary light source end cap and replacing it with the adapter.

4. The supplemental light apparatus of claim 1, in which the adapter proximal end is engaged with the primary light source via friction mounting.

5. The supplemental light apparatus of claim 1, in which the primary light source is an automobile parking and turn light bulb.

6. The supplemental light apparatus of claim 5, in which the automobile parking and turn light bulb is modified by removal of an end cap from a distal end to which the adapter is engaged.

7. The supplemental light apparatus of claim 2, in which the adapter distal end contains a frustoconical portion and the adapter proximal end contains a hollow portion.

8. The supplemental light apparatus of claim 7, in which the adapter distal end further comprises a cavity for receiving the supplemental light source.

9. The supplemental light apparatus of claim 8, in which the supplemental light source is generally circular, and the cavity for receiving the supplemental light source is generally circular.

10. The supplemental light apparatus of claim 8, in which the adapter includes an opening in the proximal end that extends to the distal end, the supplemental light source further comprising a wiring assembly connecting the supplemental light source with a controller.

11. The supplemental light apparatus of claim 10, in which the controller comprises a switch, operable to apply power to the supplemental light source.

12. The supplemental light apparatus of claim 1, in which the supplemental light source comprises:
    one or more light emitting diodes (LEDs);
    an LED control circuit board, to which the LEDs are mounted; and
    a wiring assembly interconnecting the LED control circuit board with a switch.

13. The supplemental light apparatus of claim 12, in which the supplemental light source is a strobe light.

14. The supplemental light apparatus of claim 1, in which the supplemental light source is a strobe light.

15. The supplemental light apparatus of claim 1, in which the supplemental light source comprises an LED having a color different from that of light emitted by the primary light source.

16. The supplemental light apparatus of claim 1, further comprising a primary light source.

17. The supplemental light apparatus of claim 16, in which the supplemental light source is controlled independently from the primary light source.

18. The supplemental light apparatus of claim 1, in which the adapter further comprises:
    a collar forming an adapter periphery; and
    a lens retained by a distal side of the adapter collar;
    wherein the supplemental light source is mounted beneath the lens.

19. The supplemental light apparatus of claim 1, in which the adapter and supplemental light source are provided as a kit to retrofit onto a pre-existing primary light source.

20. A method of installing a strobe light on an emergency or safety vehicle, comprising:
    providing an adapter for engaging a strobe light assembly to an existing parking and turn light, the strobe light assembly comprising one or more strobe lights and a control circuit;
    engaging the adapter to an end of the parking and turn signal light;
    engaging the strobe light assembly to the adapter; and
    hardwiring the strobe light circuit board to a strobe light controller on a vehicle.

21. The method of claim 20, in which the strobe light controller is a switch.

22. The method of claim 20, further comprising the step of inserting the combined parking and turn signal light, adapter and strobe light assembly into an existing opening in a vehicle light housing.

23. The method of claim 20, wherein the adapter comprises a distal and a proximal end, wherein the distal end contains a frustoconical portion having an aperture configured to receive the strobe light assembly, and the proximal end contains a hollow portion configured for mounting onto the parking and turn signal light.

24. A light apparatus for mounting within a vehicle light housing, the light apparatus comprising:
- a primary light bulb, the primary light bulb having a connector for insertion into a motor vehicle light socket;
- a supplemental light source mounted on the primary light bulb, the supplemental light source comprising one or more LEDs and a circuit for driving the one or more LEDs; and
- a wiring assembly extending from the supplemental light source to a controller, via which the supplemental light source may be controlled independently of the primary light bulb.

25. The light apparatus of claim 24, in which the controller is a switch.

26. The light apparatus of claim 24, in which the supplemental light source is a strobe light.

\* \* \* \* \*